United States Patent
Brasz et al.

(10) Patent No.: US 10,184,481 B2
(45) Date of Patent: *Jan. 22, 2019

(54) CENTRIFUGAL COMPRESSOR WITH EXTENDED OPERATING RANGE

(71) Applicant: DANFOSS A/S, Nordborg (DK)

(72) Inventors: Joost Brasz, Fayetteville, NY (US); Mogens Rasmussen, Tallahassee, FL (US)

(73) Assignee: DANFOSS A/S (DK)

( * ) Notice: Subject to any disclaimer, the term of this patent is extended or adjusted under 35 U.S.C. 154(b) by 640 days.

This patent is subject to a terminal disclaimer.

(21) Appl. No.: 14/832,399

(22) Filed: Aug. 21, 2015

(65) Prior Publication Data

US 2015/0354589 A1 Dec. 10, 2015

Related U.S. Application Data

(63) Continuation of application No. 14/096,395, filed on Dec. 4, 2013, now Pat. No. 9,157,446.

(Continued)

(51) Int. Cl.
  *F04D 27/00* (2006.01)
  *F04D 29/44* (2006.01)
  (Continued)

(52) U.S. Cl.
  CPC ......... *F04D 27/009* (2013.01); *F04D 17/122* (2013.01); *F04D 27/0215* (2013.01);
  (Continued)

(58) Field of Classification Search
  CPC ............ F04D 27/0207; F04D 27/0215; F04D 27/023; F04D 27/0238
  (Continued)

(56) References Cited

U.S. PATENT DOCUMENTS 2,277,647 A 3/1942 Walter
2,793,506 A 5/1957 Moody
(Continued)

FOREIGN PATENT DOCUMENTS

CN 103154525 A 6/2013
CN 103174678 A 6/2013
(Continued)

OTHER PUBLICATIONS

Supplementary European Search Report for European patent Application No. 13873896.8 completed Aug. 23, 2016.
(Continued)

*Primary Examiner* — Jianying Atkisson
*Assistant Examiner* — Antonio R Febles
(74) *Attorney, Agent, or Firm* — Carlson, Gaskey & Olds, P.C.

(57) ABSTRACT

This disclosure relates to a centrifugal compressor. In a first example, the compressor includes a first impeller provided in a main refrigerant flow path, a second impeller provided in the main refrigerant flow path downstream of the first impeller, and a recirculation flow path. In the first example, the recirculation flow path is provided between a first location and a second location along the main refrigerant flow path. The first location is downstream of the second location, and the second location is downstream of the first impeller. In a second example, the compressor includes an impeller provided in a main refrigerant flow path, and a recirculation flow path provided between a first location and a second location along the main refrigerant flow path. In the second example, the recirculation flow path includes a recirculation volute. Further disclosed is a method for operating a centrifugal compressor.

15 Claims, 6 Drawing Sheets

Related U.S. Application Data

(60) Provisional application No. 61/758,817, filed on Jan. 31, 2013.

(51) Int. Cl.
*F04D 27/02* (2006.01)
*F25B 1/053* (2006.01)
*F25B 1/10* (2006.01)
*F04D 17/12* (2006.01)

(52) U.S. Cl.
CPC ....... *F04D 27/0238* (2013.01); *F04D 29/444* (2013.01); *F25B 1/053* (2013.01); *F25B 1/10* (2013.01); *F05D 2250/52* (2013.01); *F25B 2600/0253* (2013.01); *F25B 2600/0262* (2013.01); *Y02B 30/741* (2013.01)

(58) Field of Classification Search
USPC ..... 62/228.5, 498, 196.1; 417/250, 253, 307
See application file for complete search history.

(56) References Cited

U.S. PATENT DOCUMENTS

| | | | |
|---|---|---|---|
| 2,888,809 | A | 6/1959 | Rachfal |
| 3,011,322 | A | 12/1961 | Tanzberger et al. |
| 3,070,974 | A | 1/1963 | Greenwald |
| 3,232,074 | A | 2/1966 | Weller et al. |
| 3,391,858 | A | 7/1968 | Lancey |
| 3,741,676 | A | 6/1973 | Silvern et al. |
| 3,901,620 | A | 8/1975 | Boyce |
| 4,094,613 | A | 6/1978 | Bracken |
| 4,378,194 | A | 3/1983 | Bandukwalla |
| 4,503,684 | A | 3/1985 | Mount et al. |
| 4,695,224 | A | 9/1987 | Lown |
| 4,938,661 | A | 7/1990 | Kobayashi et al. |
| 5,669,756 | A | 9/1997 | Brasz et al. |
| 5,709,526 | A | 1/1998 | McLeister et al. |
| 6,036,432 | A | 3/2000 | Sishtla et al. |
| 6,155,802 | A | 12/2000 | Choi et al. |
| 6,672,826 | B2 | 1/2004 | LeDuc |
| 7,326,027 | B1 | 2/2008 | Skoch et al. |
| 7,556,473 | B2 | 7/2009 | Takeshita et al. |
| 7,871,239 | B2 | 1/2011 | Sorokes |
| 8,021,104 | B2 | 9/2011 | Gu et al. |
| 8,122,724 | B2 | 2/2012 | Slovisky et al. |
| 8,156,757 | B2 | 4/2012 | Doty et al. |
| 8,210,793 | B2 | 7/2012 | Hale |
| 8,287,232 | B2 | 10/2012 | Gu et al. |
| 8,532,830 | B2 | 9/2013 | Van Dijk |
| 8,567,184 | B2 | 10/2013 | Scotti Del Greco et al. |
| 8,567,207 | B2 | 10/2013 | Sommer et al. |
| 2002/0014088 | A1 | 2/2002 | Seki et al. |
| 2005/0076656 | A1 | 4/2005 | Bodell et al. |
| 2005/0223737 | A1 | 10/2005 | Conry |
| 2006/0045772 | A1 | 3/2006 | Slovisky et al. |
| 2007/0144170 | A1 | 6/2007 | Griffith |
| 2007/0154304 | A1 | 7/2007 | Abdallah |
| 2009/0087321 | A1 | 4/2009 | Morozumi |
| 2009/0213686 | A1 | 8/2009 | Heikkilae et al. |
| 2010/0129205 | A1 | 5/2010 | Schwerdel |
| 2010/0143111 | A1 | 6/2010 | Kuehnel |
| 2011/0214421 | A1 | 9/2011 | Schmitt et al. |
| 2011/0277498 | A1 | 11/2011 | Kaart |
| 2012/0048387 | A1 | 3/2012 | Galeotti |
| 2013/0036760 | A1 | 2/2013 | Sun et al. |
| 2013/0209222 | A1 | 8/2013 | Schofield |
| 2013/0220289 | A1 | 8/2013 | Maceroni et al. |
| 2013/0236300 | A1 | 9/2013 | Hiller et al. |

FOREIGN PATENT DOCUMENTS

| | | |
|---|---|---|
| DE | 842893 C | 7/1952 |
| DE | 102005046144 A1 | 6/2006 |
| DE | 102008007027 A1 | 8/2009 |
| DE | 102013201482 B3 | 10/2013 |
| EP | 1321679 B1 | 10/2004 |
| EP | 1557568 A2 | 7/2005 |
| EP | 1651847 B1 | 11/2006 |
| EP | 1753961 B1 | 7/2008 |
| EP | 1942259 A2 | 7/2008 |
| EP | 1640673 B1 | 8/2008 |
| EP | 1654462 B1 | 10/2008 |
| EP | 2080908 A2 | 7/2009 |
| EP | 1783048 B1 | 6/2011 |
| EP | 2377759 A1 | 10/2011 |
| EP | 2385230 A2 | 11/2011 |
| EP | 2423515 A1 | 2/2012 |
| EP | 2447541 A1 | 5/2012 |
| EP | 2615308 A1 | 7/2013 |
| EP | 1704330 B1 | 11/2013 |
| FR | 2920829 A1 | 3/2009 |
| GB | 2268228 A | 1/1994 |
| GB | 2305974 A | 4/1997 |
| WO | 2013128093 A1 | 9/2013 |
| WO | 2013139568 A1 | 9/2013 |

OTHER PUBLICATIONS

Vikas Kumar, "Active Control of Flow Separation Using Supersonic Microjets", Copyright 2003 by ASME.

Vikas Kumar, "Efficient control of Separation Using Microjets", American Institute of Aeronautics and Astronautics.

Vikas Kumar, "Toward Understanding and Optimizing Separation Control Using Microjets", AIAA Journal, vol. 47, No. 11, Nov. 2009.

CENTRIFUGAL COMPRESSOR WITH EXTENDED OPERATING RANGE

RELATED APPLICATIONS

This application is a continuation of prior U.S. application Ser. No. 14/096,395, filed Dec. 4, 2013, which claims the benefit of U.S. Provisional Application No. 61/758,817, filed Jan. 31, 2013. The '395 application and the '817 Provisional Application are herein incorporated by reference in their entirety.

BACKGROUND

Refrigerant compressors are used to circulate refrigerant in a chiller via a refrigerant loop. One type of known refrigerant compressor operates at fixed speed and has a set of variable inlet guide vanes arranged at a compressor inlet, upstream from an impeller. The variable inlet guide vanes are actuated during operation of the refrigerant compressor to regulate capacity during various operating conditions.

Other known refrigerant compressors have additionally employed a variable-geometry diffuser downstream from an impeller to improve capacity control during part-load operating conditions. Variable-geometry diffusers adjust the diffuser cross-sectional flow area to the low flow rate encountered under part-load conditions, thus maintaining flow angles and velocities similar to those at full-load design conditions.

One prior refrigerant compressor concept suggested recirculating refrigerant to improve capacity control. In U.S. Pat. No. 5,669,756 to Brasz, for example, the refrigerant is recirculated from a diffuser exit, and is injected back into a main flow path at the impeller.

SUMMARY

This disclosure relates to a centrifugal compressor. In a first example, the compressor includes a first impeller provided in a main refrigerant flow path, a second impeller provided in the main refrigerant flow path downstream of the first impeller, and a recirculation flow path. In the first example, the recirculation flow path is provided between a first location and a second location along the main refrigerant flow path. The first location is downstream of the second location, and the second location is downstream of the first impeller. In a second example, the compressor includes an impeller provided in a main refrigerant flow path, and a recirculation flow path provided between a first location and a second location along the main refrigerant flow path. In the second example, the recirculation flow path includes a recirculation volute. Further disclosed is a method for operating a centrifugal compressor.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
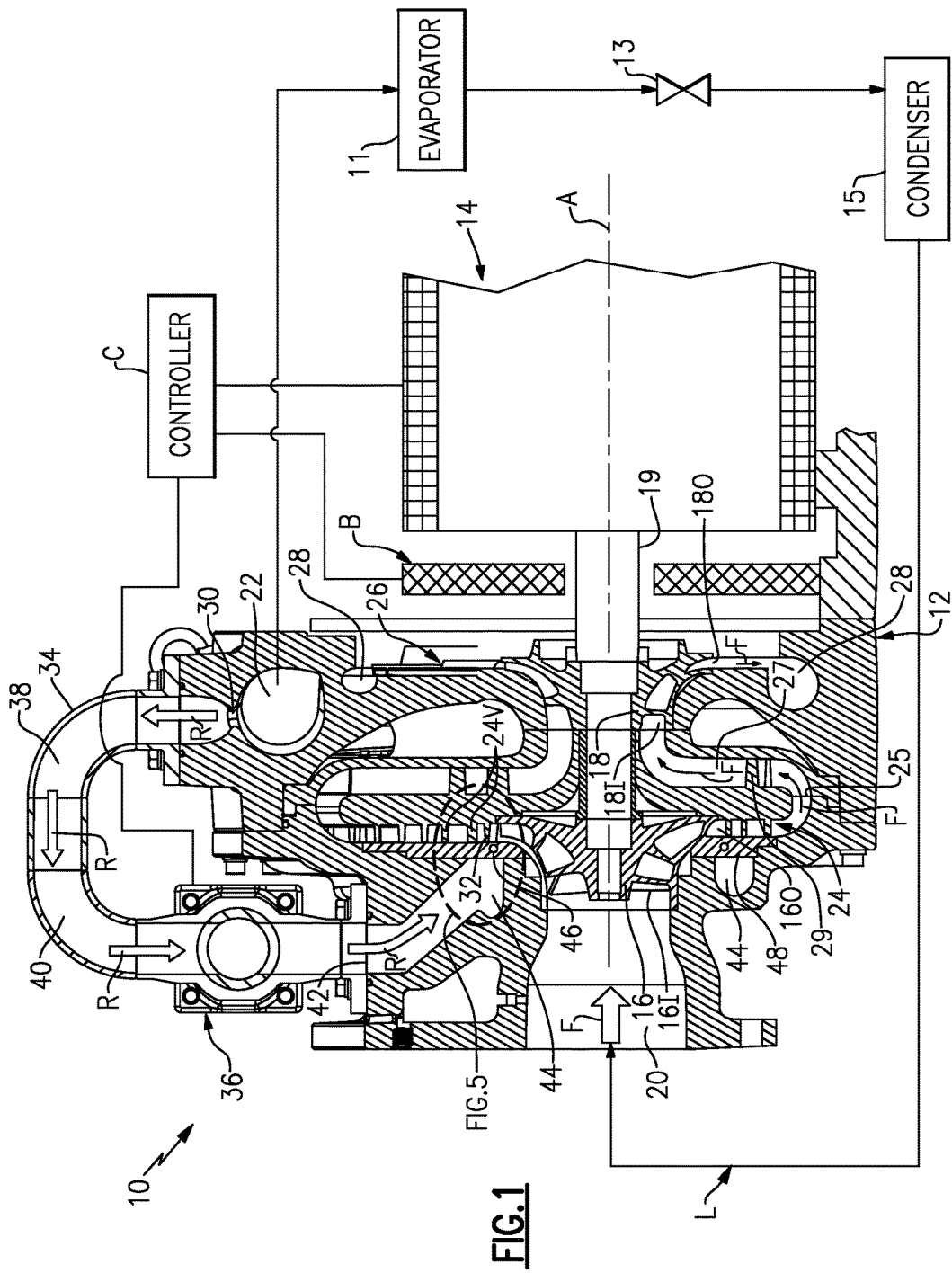
FIG. 1 is a highly schematic view of a refrigerant compressor.

FIG. 1 illustrates a refrigerant compressor 10 ("compressor 10") for circulating a refrigerant. Example refrigerants include chemical refrigerants, such as R-134a and the like. In one example, the compressor 10 is in fluid communication with a refrigeration loop L. Refrigeration loops L are known to include a condenser 11, an expansion device 13, and an evaporator 15.

The compressor 10 includes a housing 12, which encloses an electric motor 14. The housing 12 may comprise one or more pieces. The electric motor 14 rotationally drives at least one impeller about an axis A to compress refrigerant. The motor 14 may be driven by a variable frequency drive. The compressor 10 includes a first impeller 16 and a second impeller 18, each of which is connected to the motor 14 via a shaft 19. While two impellers are illustrated, this disclosure extends to compressors having additional, or fewer, impellers. The shaft 19 is supported by a bearing assembly B, which in this example is a magnetic bearing assembly.

The housing 12 establishes a main refrigerant flow path F. In particular, the housing 12 establishes an outer boundary for the main refrigerant flow path F. A first, or main, flow of refrigerant is configured to flow along the main refrigerant flow path F between a compressor inlet 20 and a compressor outlet 22. In this example, there are no inlet guide vanes disposed at the compressor inlet 20. The lack of inlet guide vanes reduces the number of mechanical parts in the compressor 10, which would require maintenance and/or replacement after prolonged use. As will be appreciated from the below, the presence of the first vaned diffuser 24 allows for the elimination of inlet guide vanes.

From left to right in FIG. 1, the main refrigerant flow path F begins at the compressor inlet 20, where refrigerant is drawn toward the first impeller 16. The first impeller 16 is provided in the main refrigerant flow path F, and is arranged upstream of the second impeller 18 relative to the main refrigerant flow path F. The first impeller 16 includes an inlet 16I arranged axially, generally parallel to the axis A, and an outlet 16O arranged radially, generally perpendicular to the axis A.

Immediately downstream of the outlet 16O, in this example, is a first vaned diffuser 24. The first vaned diffuser 24 includes a plurality of vanes 24V. In this example, the vanes 24V are stationary vanes. That is, the relative orientation of vanes 24V is not adjustable during operation of the compressor 10, and the flow path created between the vanes 24V is not adjustable during operation of the compressor 10. While this disclosure is not limited to stationary vaned diffusers, using a diffuser with stationary vanes has the advantage of reducing the number of mechanical parts in the compressor 10 (which, again, would need to be serviced and/or replaced after a period of use). Further, avoiding a variable geometry diffuser may have the benefit of eliminating leakage flow that is commonly associated with variable geometry diffusers.

The main refrigerant flow path F extends through the diffuser 24 in a direction generally radially away from the axis A. Next, the main refrigerant flow path F turns 180 degrees in a cross-over bend 25, and flows radially inward through a return channel 27 having deswirl vanes 29 toward the second impeller 18. Like the first impeller 16, the second impeller 18 includes an axially oriented inlet 181 and a radially oriented outlet 180. A second stage diffuser 26 is arranged downstream of the second impeller 18. In this example, the second stage diffuser 26 includes stationary vanes. The second stage diffuser need not include vanes, however. An outlet volute 28 is provided downstream of the second stage diffuser 26. The outlet volute 28 generally spirals about the axis A and leads to the compressor outlet 22.

The compressor 10, in this example, includes a recirculation flow path R configured to recirculate a portion of the refrigerant (i.e., a "second flow" of refrigerant) from the main refrigerant flow path F from a first location 30 to a second location 32 upstream of the first location 30. In this example, the first location 30 is adjacent the compressor outlet 22, and the second location 32 is located downstream of the first impeller 16, as will be discussed below. The first and second locations 30, 32 may be provided at other locations, however, without departing from the scope of this disclosure. Alternative candidates for the first location 30 are the cross-over bend 25, or a location within the return channel 27. The second location 32 may alternatively be provided at the inlet of the second stage diffuser 26.

The recirculation flow path R is provided, in part, by a recirculation line 34. In this example, the recirculation line 34 extracts its flow from outlet volute 28, at which point the flow of fluid is swirl-free. This in contrast to extracting the flow circumferentially at the exit of the diffuser, in which case multiple passages separated by deswirl vanes are needed to maintain the pressure required for injection of the flow through the recirculation nozzles 46. Without deswirl vanes, conservation of angular momentum causes an increase in velocity and a decrease in pressure due to the smaller radius of the recirculation nozzles 46. This reduction in static pressure limits the recirculation flow R as a result of the reduced pressure differential over the recirculation nozzles 46.

The recirculation flow path R further includes a flow regulator 36. In this example, the flow regulator 36 is provided external to the housing 12, in the recirculation line 34. This allows for ease of replacement and installation of the flow regulator 36. The flow regulator 36 may be any type of device configured to regulate a flow of refrigerant, including mechanical valves, such as butterfly, gate or ball valves with electrical or pneumatic control (e.g., valves regulated by existing pressures). The flow regulator 36 may include an actuator operable to position a valve in response to instructions from a controller C. The controller C may be any known type of controller including memory, hardware, and software. The controller C is configured to store instructions, and to provide those instructions to the various components of the compressor 10 (including the motor 14, and other structures, such as magnetic bearing assembly B). The controller C may further include one or more components.

The recirculation flow path R initially extends radially outward, in a direction generally normal to the axis A, from the first location 30 along the main refrigerant flow path F to a first bend 38 in the recirculation line 34. The recirculation flow path R then extends axially, from right to left in FIG. 1 (and generally parallel to the axis A), from the first bend 38 to a second bend 40, where the recirculation flow path R then turns radially inward toward the axis A. In this example, the flow regulator 36 is provided in the recirculation flow path R downstream of the second bend 40. While the recirculation flow path R is illustrated in a particular manner, the recirculation flow path R may be arranged differently.

Downstream of the flow regulator 36, the recirculation flow path R enters the housing 12 at an entrance 42 to a recirculation volute 44. The velocity (kinetic energy) of the fluid in the recirculation line 34 is maintained entering the recirculation volute 44 while it is lost entering a plenum (such as the plenum 154). As a result, the recirculation volute 44 results in a more effective flow recirculation system.

The recirculation volute 44 spirals around the axis A, and is in communication with a plurality of recirculation nozzles 46. In this example, the number of recirculation nozzles 46 corresponds to the number of passages between diffuser vanes 24V, although a different number of recirculation nozzles 46 can be provided. In this example, the recirculation nozzles 46 are formed in an injector plate 48. Refrigerant within the recirculation flow path R is introduced into the main refrigerant flow path F via the recirculation nozzles 46, as will be discussed below.

Figure 2:
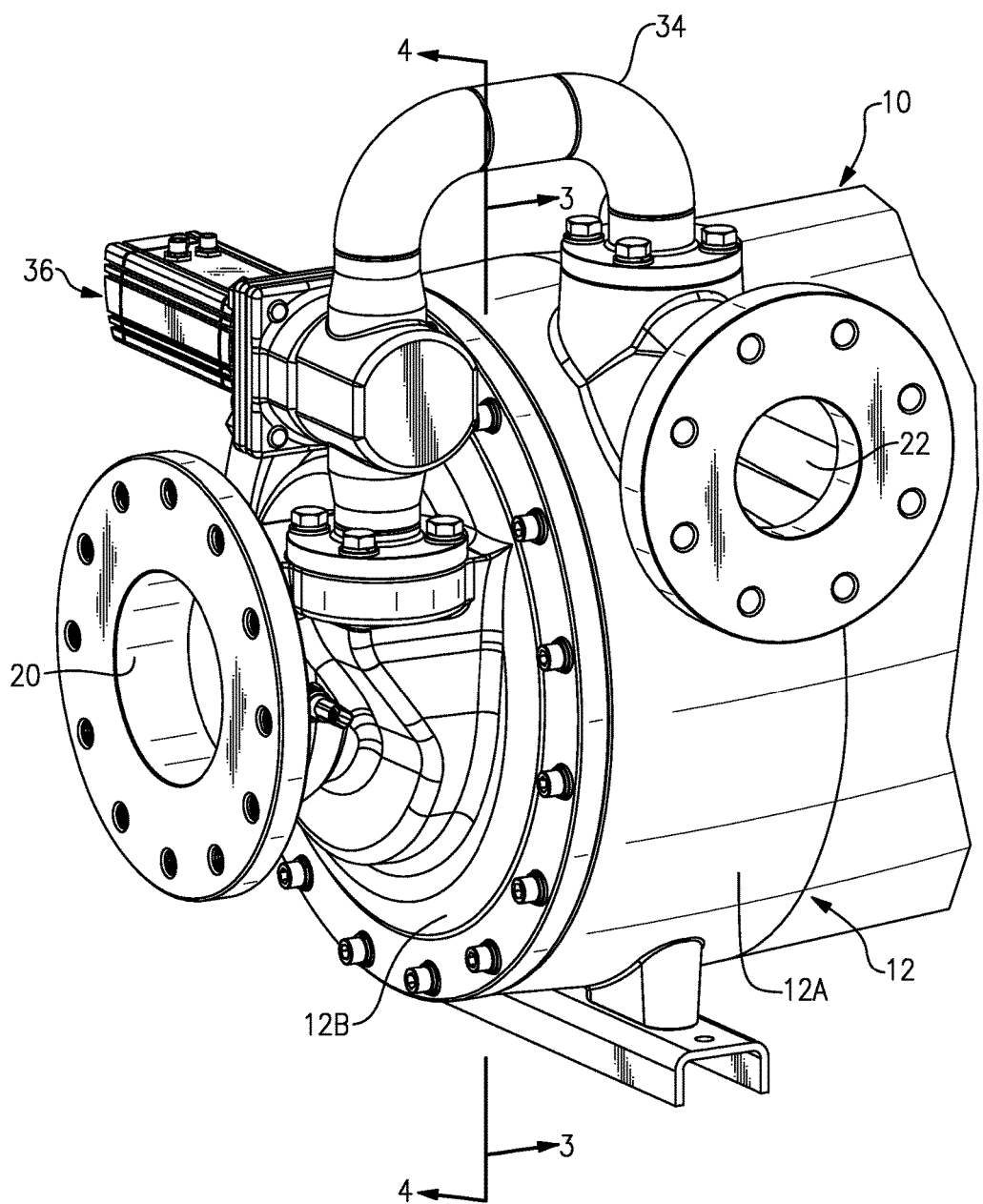
FIG. 2 is an exterior, perspective view of a portion of the refrigerant compressor of FIG. 1.

FIG. 2 illustrates the portion of the compressor 10 from an exterior perspective. As illustrated, the housing 12 may include separate pieces, illustrated as first and second portions 12A, 12B. The compressor outlet 22 is established by the first portion 12A, while the compressor inlet 20 is established by the second portion 12B. The recirculation line 34 extends between the first portion of the housing 12A and the second portion of the housing 12B.

Figure 3:
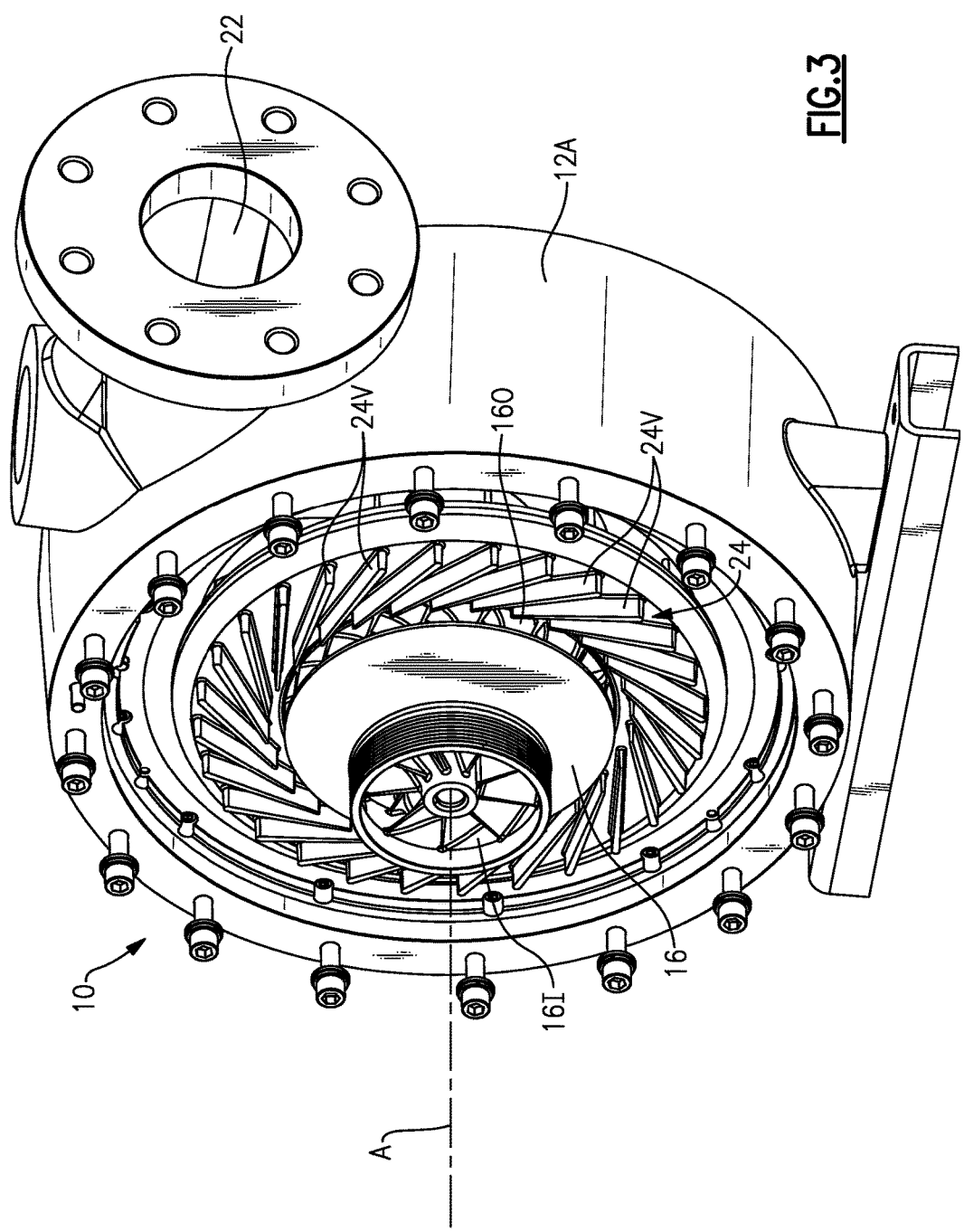
FIG. 3 is a view taken along line 3-3 from FIG. 2.

FIG. 3 is a view taken along line 3-3 in FIG. 2, and illustrates the detail of the first portion of the housing 12A with the second portion of the housing 12B removed. In particular, FIG. 3 illustrates the arrangement of the first impeller 16 relative to the first vaned diffuser 24. As illustrated, the vanes 24V are positioned adjacent one another, and a plurality of throats T (FIG. 6) are established between adjacent vanes 24V. As refrigerant is expelled radially outward with a large tangential velocity component from the first impeller 16, that refrigerant passes through the throats T.

Figure 4:
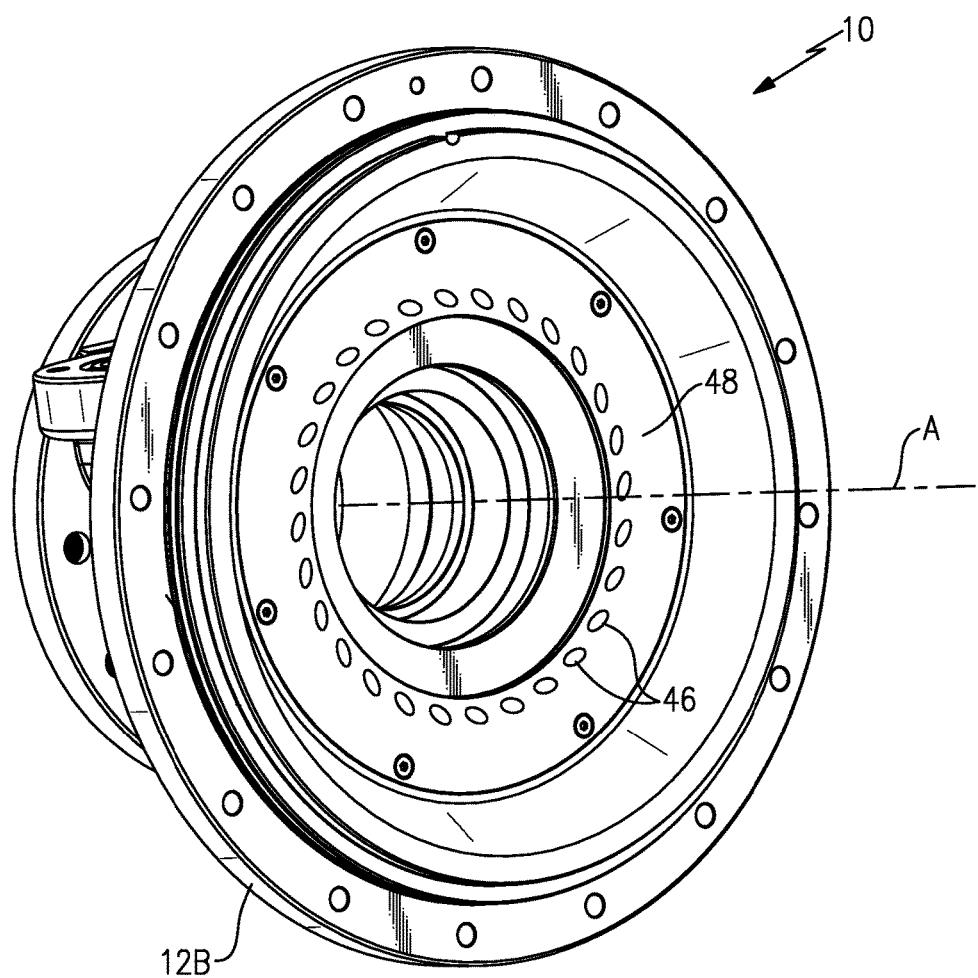
FIG. 4 is a view taken along line 4-4 from FIG. 2.

FIG. 4 is a view taken along line 4-4 in FIG. 2, and illustrates the second portion of the housing 12B with the first portion of the housing 12A removed. In particular, FIG. 4 illustrates the detail of an injector plate 48, which includes a plurality of recirculation nozzles 46. The injector plate 48 may be formed integrally with the first portion of the housing 12A, or be attached separately.

Figure 6:
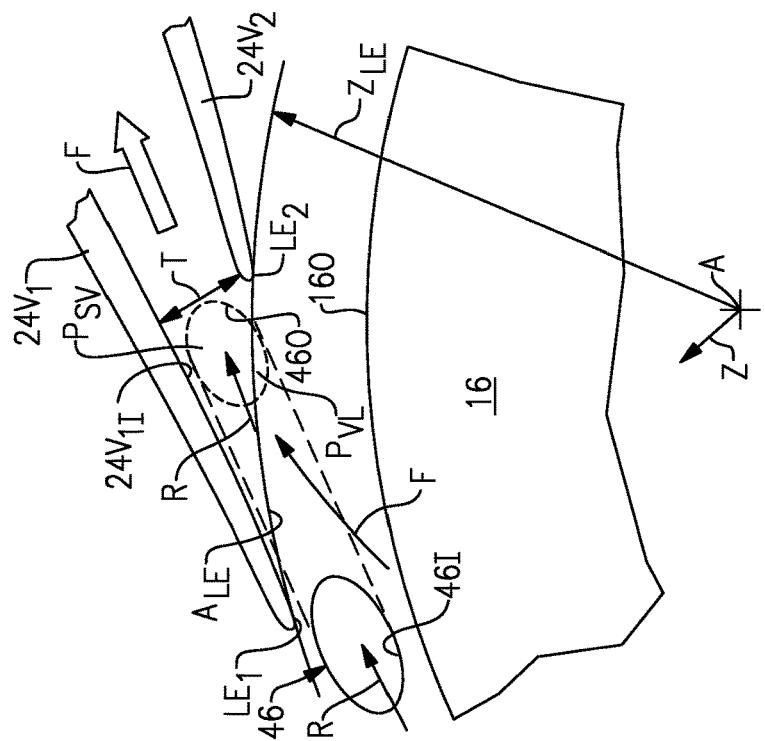
FIG. 6 illustrates an example arrangement of the recirculation flow nozzles relative to the diffuser vanes.
Figure 5:
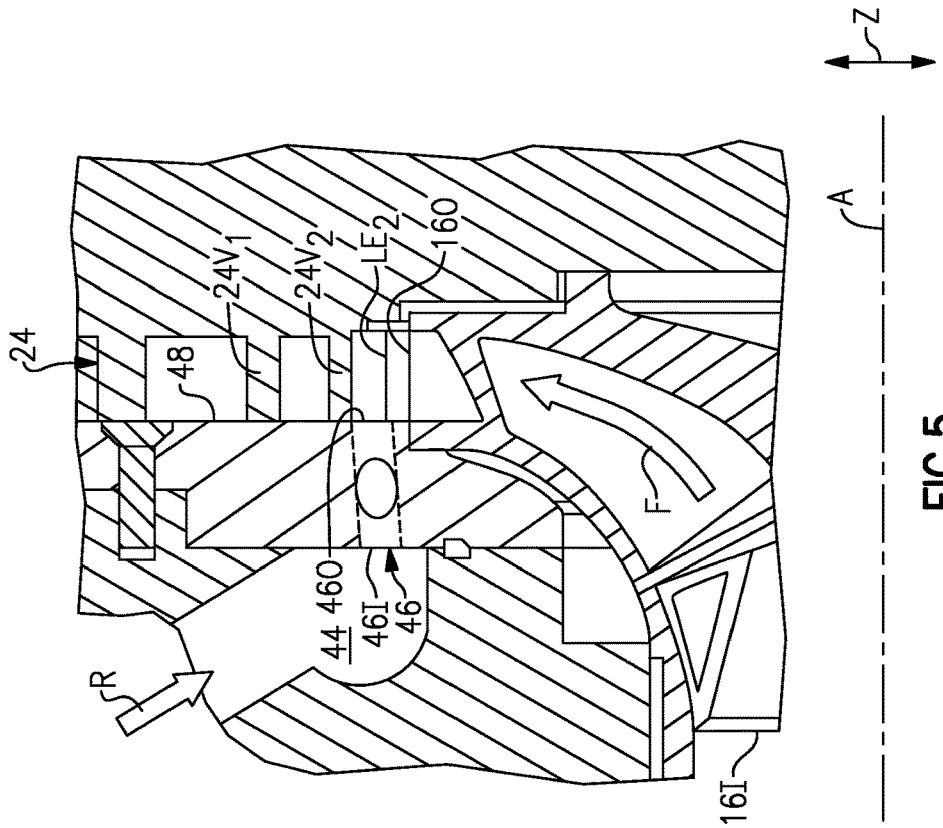
FIG. 5 is a view of the encircled area in FIG. 1.

FIGS. 5-6 illustrate the arrangement of the recirculation nozzles 46 relative to the first vaned diffuser 24V. FIG. 5 is a close-up view showing the detail of the encircled area in FIG. 1. As illustrated in FIG. 5, the recirculation nozzles 46 each include an inlet 46I adjacent the recirculation volute 44, and an outlet 46O adjacent the vanes 24V. In one example, the recirculation nozzles 46 are radially inclined away from the axis A, as the recirculation nozzles 46 move from the inlet 46I to the inlet 46O in order to match the radial component of the flow leaving the impeller 16.

FIG. 6 represents the arrangement of one recirculation nozzle 46 relative to two adjacent vanes $24V_1$, $24V_2$. In one example, the recirculation nozzle 46 is arranged such that the outlet 46O is provided adjacent the throat T spanning between the adjacent vanes $24V_1$, $24V_2$. The throat T is defined as the smallest cross-sectional area normal to the diffuser flow direction. Viewed along the axis A, the throat T becomes the shortest distance between the adjacent vanes $24V_1$, $24V_2$. In particular, in one example the outlet 46O is entirely upstream of the throats T. Further, as would be appreciated from the foregoing description and FIG. 6 itself, in the illustrated example the outlet 46O is at least partially radially outward of the leading edges $LE_1$, $LE_2$ of the vanes $24V_1$, $24V_2$, respectively. The leading edges $LE_1$, $LE_2$ of the vanes are provided at a radial distance $Z_{LE}$ measured in a radial direction Z (which is normal to the axis A) from the axis A. As is known in the art, there is a space that may be referred to as a "semi-vaneless" space between each of the adjacent vanes. The semi-vaneless space is bounded by (1) an arc $A_{LE}$ about the axis A having a radius $Z_{LE}$ and an arc length at least as long as the distance between adjacent leading edges $LE_1$, $LE_2$, (2) the throat T, and a (3) radially inner surface $24V_{1I}$ of vane $24V_1$. A "vaneless" space is upstream of the arc $A_{LE}$, and a "vaned" space is downstream of the throat T. Using these definitions, the outlet 46O in the example of FIG. 6 has a semi-vanless portion $P_{SV}$ radially aligned with the semi-vaneless space (when viewed along axis A), and a vaneless portion $P_{VL}$ radially aligned with a vaneless space. In another example, at least a portion of the outlet 46O overlaps the throat T when viewed along the axis A. That is, the outlet 46O is at least partially radially aligned with the throat T. In that example, the outlet 46O may be completely within the semi-vaneless space, or may be partially within the semi-vaneless space and partially within the vaned space. In any example, again, the outlet 46O is at least partially radially outward of the leading edge of the vanes. Further, as illustrated, the recirculation nozzles 46 are inclined in such that the inlet 46I is circumferentially spaced, around the axis A, from the outlet 46O in order to match the tangential component of the flow leaving the impeller 16. While not illustrated in FIG. 6 for purposes of clarity, it should be understood that each of the recirculation nozzles 46 may be arranged between adjacent vanes 24V as generally illustrated in FIG. 6.

Depending on the operating conditions of the compressor 10, the flow regulator 36 may be selectively controlled (via the controller C) to remove a portion of the refrigerant within the main refrigerant flow path F, at the first location 30, and to inject that removed portion of refrigerant back into the main refrigerant flow path F via the recirculation flow path R. In one example, the flow regulator 36 is controlled by the controller C in response to the operating capacity of the compressor 10. The operating capacity of the compressor 10 may be monitored by monitoring a temperature of a fluid (e.g., water) within a chiller.

In one example, the flow regulator 36 is closed when the compressor is operating at a normal capacity. A normal capacity range is about 40-100% of the designed capacity. At relatively low, part-load operating capacities (e.g., around 30% of the designed capacity), however, the controller C instructs the flow regulator 36 to open, such that refrigerant is injected into the main refrigerant flow path F via the recirculation flow path R. Additionally or alternatively, the controller may instruct the flow regulator 36 to open during compressor start-up in some examples.

The injection of refrigerant from the recirculation flow path R increases the stability of operation of the compressor 10 in part-load conditions by allowing the downstream elements (e.g., the first vaned diffuser 24, return channel 27, the second impeller 18, and the second stage diffuser 26) to experience flows closer to their optimum range. In turn, this extends the efficient operating range of the compressor 10 to lower, part-load operating conditions, which reduces the likelihood of a surge condition. Further, and as mentioned above, the compressor 10 may do so without the need for inlet guide vanes or variable geometry diffusers, which increases the reliability of the compressor 10.

Figure 7:
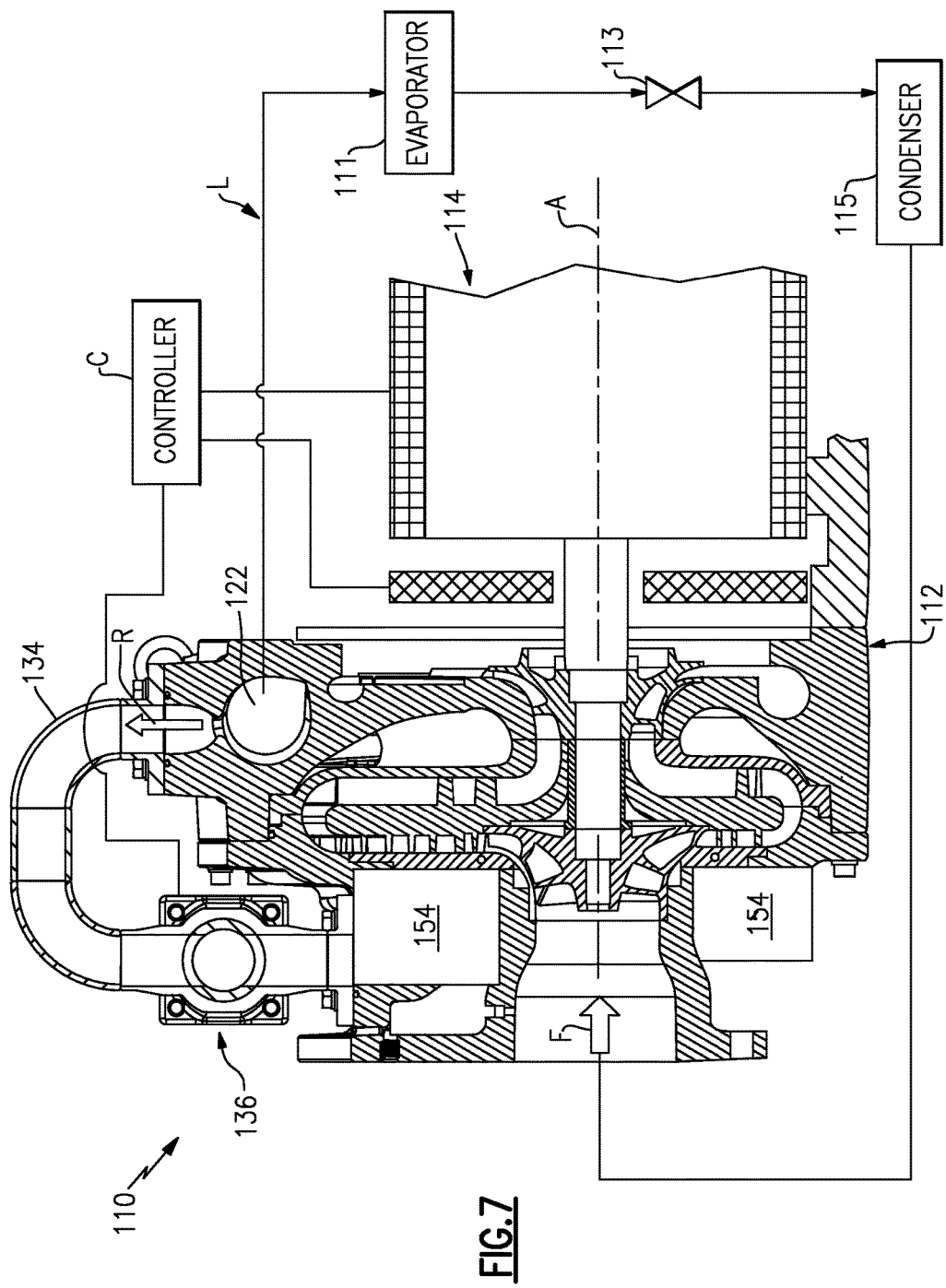
FIG. 7 is a highly schematic view of another refrigerant compressor.

FIG. 7 illustrates another example compressor 110 according to this disclosure. To the extent not otherwise described or shown, the compressor 110 corresponds to the compressor 10 of FIGS. 1-6, with like parts having reference numerals preappended with a "1." The compressor 110 includes a plenum 154 in place of the recirculation volute 44. The plenum 154 is not spiraled about the axis A in the way of the recirculation volute 44, and may provide an effective alternative to the recirculation volute 44.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A centrifugal compressor, comprising:
   a first impeller provided in a main refrigerant flow path;
   a second impeller provided in the main refrigerant flow path downstream of the first impeller;
   a first vaned diffuser downstream of the first impeller;
   a recirculation flow path provided between a first location and a second location along the main refrigerant flow path, the first location being downstream of the second impeller, the second location being adjacent the first vaned diffuser and downstream of the first impeller; and
   a plurality of recirculation nozzles provided in the recirculation flow path, wherein outlets of the recirculation nozzles are arranged at least partially radially outward of leading edges of vanes of the first vaned diffuser.

2. The compressor as recited in claim 1, wherein the compressor includes an outlet volute downstream of the second impeller, the first location adjacent the outlet volute.

3. The compressor as recited in claim 1, wherein the outlets of the recirculation nozzles axially overlap throats between adjacent vanes of the first vaned diffuser.

4. The compressor as recited in claim 1, wherein the recirculation flow path includes a recirculation volute adjacent the inlets of the recirculation nozzles.

5. The compressor as recited in claim 1, wherein the recirculation flow path includes a plenum adjacent the inlets of the recirculation nozzles.

6. The compressor as recited in claim 1, including an injection plate, the recirculation nozzles formed in the injection plate.

7. The compressor as recited in claim 1, further including:
   a controller; and
   a flow regulator provided in the recirculation flow path, the flow regulator selectively regulating a flow of refrigerant within the recirculation flow path in response to instructions from the controller.

8. The compressor as recited in claim 7, wherein the controller provides instructions to the flow regulator in response to a compressor operating capacity.

9. The compressor as recited in claim 1, wherein second location is upstream of the second impeller.

10. The compressor as recited in claim 1, wherein at least a portion of the recirculation flow path is external to a compressor housing.

11. The compressor as recited in claim 10, wherein the recirculation flow path has no deswirl vanes.

12. The compressor as recited in claim 1, wherein there are no inlet guide vanes disposed at an inlet of the compressor.

13. The compressor as recited in claim 1, wherein the flow regulator includes an actuator and a mechanical valve.

14. A centrifugal compressor, comprising:
   an impeller provided in a main refrigerant flow path;
   an outlet volute downstream of the impeller;
   a recirculation flow path provided between a first location and a second location along the main refrigerant flow path, the recirculation flow path including a recirculation volute; and
   a plurality of recirculation nozzles provided in the recirculation flow path, each of the recirculation nozzles having an outlet arranged at least partially radially outward of leading edges of vanes of a vaned diffuser, each of the recirculation nozzles having inlets in communication with the recirculation volute.

15. A method of operating a centrifugal compressor, comprising:
   establishing a first flow of refrigerant along a main refrigerant flow path;
   pressurizing the first flow of refrigerant with a first impeller;
   selectively introducing a second flow of refrigerant into the main refrigerant flow path at a location downstream of the first impeller and at a location at least partially radially outward of vanes of a vaned diffuser, the second flow of refrigerant sourced from the main refrigerant flow path; and
   pressurizing the combined first and second flows of refrigerant with a second impeller, wherein the second flow of refrigerant is sourced from the main refrigerant flow path at a location downstream of the second impeller.

* * * * *